US012774360B2

(12) United States Patent
Thuilliez et al.

(10) Patent No.: US 12,774,360 B2
(45) Date of Patent: Oct. 27, 2026

(54) DIORGANOMAGNESIUM COMPOUND FOR A CATALYTIC SYSTEM

(71) Applicant: COMPAGNIE GENERALE DES ETABLISSEMENTS MICHELIN, Clermont-Ferrand (FR)

(72) Inventors: Julien Thuilliez, Clermont-Ferrand (FR); Robert Ngo, Clermont-Ferrand (FR); François Jean-Baptiste-Dit-Dominique, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1162 days.

(21) Appl. No.: 17/783,018

(22) PCT Filed: Dec. 14, 2020

(86) PCT No.: PCT/FR2020/052427
§ 371 (c)(1),
(2) Date: Oct. 4, 2022

(87) PCT Pub. No.: WO2021/123590
PCT Pub. Date: Jun. 24, 2021

(65) Prior Publication Data

US 2023/0145123 A1 May 11, 2023

(30) Foreign Application Priority Data

Dec. 17, 2019 (FR) ...................................... 1914625

(51) Int. Cl.
*C08F 297/06* (2006.01)
*C08F 236/06* (2006.01)

(52) U.S. Cl.
CPC .......... *C08F 297/06* (2013.01); *C08F 236/06* (2013.01)

(58) Field of Classification Search
CPC ............................ C08F 297/06; C08F 236/06
USPC ......................................................... 524/575
See application file for complete search history.

(56) References Cited

U.S. PATENT DOCUMENTS

| | | | |
|---|---|---|---|
| 3,554,998 | A | 1/1971 | Nudenberg et al. |
| 2012/0184431 | A1 | 7/2012 | Kawashima et al. |

FOREIGN PATENT DOCUMENTS

| | | | | |
|---|---|---|---|---|
| DE | 1645489 A1 | | 7/1970 | |
| EP | 2484685 A1 | * | 8/2012 | .............. C08F 10/00 |

OTHER PUBLICATIONS

International Search Report and Written Opinion with English translation mailed Apr. 20, 2021 for International Application No. PCT/FR2020/052427, 12 pages.

Kreyenschmidt et al., "Low-Valent Ate Complexes Formed in Cobalt-Catalyzed Cross-Coupling Reactions with 1,3-Dienes as Additives," Chemistry—A European Journal, vol. 24, No. 5, 2017, 13 pages.

* cited by examiner

*Primary Examiner* — Kelechi C Egwim
(74) *Attorney, Agent, or Firm* — Dickinson Wright PLLC

(57) ABSTRACT

The invention relates to a diorganomagnesium compound of formula $R^B$—Mg—$R^A$, $R^A$ being different from $R^B$, $R^A$ being a polymer chain containing units of a monomer chosen from the group of monomers consisting of 1,3-dienes, aromatic α-monoolefins and mixtures thereof, $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, on condition that if one of the two ortho carbon atoms is substituted with an isopropyl, the second ortho carbon atom is not substituted with an isopropyl.

18 Claims, No Drawings

DIORGANOMAGNESIUM COMPOUND FOR A CATALYTIC SYSTEM

CROSS-REFERENCE TO RELATED APPLICATIONS

This U.S. national phase patent application claims priority to and the benefit of International Patent Application No. PCT/FR2020/052427, filed on Dec. 14, 2020, which claims priority to and the benefit of French patent application no. FR1914625, filed Dec. 17, 2019, the contents of which are incorporated herein by reference in their entirety.

BACKGROUND

1. Technical Field

The field of the present invention is that of organomagnesium compounds and also that of catalytic systems which comprise organomagnesium agents used as co-catalysts and which are intended to be used in the preparation of polyolefins, in particular of copolymers of olefin and of conjugated diene.

2. Related Art

Catalytic systems based on rare-earth metal metallocenes are described, for example, in patent applications EP 1 092 731, WO 2004/035639, WO 2007/054224 and WO 2018/224776. They allow the synthesis of polyolefins, in particular of copolymers of olefins and of 1,3-dienes. They are also used in the preparation of functional copolymers of ethylene and of 1,3-butadiene, as described in WO 2018/224776. In these catalytic systems, the metallocene is activated with a co-catalyst which forms part of the catalytic system. Co-catalysts that are notably suitable for use include organomagnesium agents, organoaluminium agents and organolithium agents. When the co-catalyst is an organomagnesium agent, it is typically an organomagnesium chloride or a diorganomagnesium in which the magnesium atom is bonded to two aliphatic groups, such as dibutylmagnesium, butylethylmagnesium and butyloctylmagnesium.

The synthesis of block polymers comprising a 1,3-diene homopolymer block and a copolymer block of ethylene and of 1,3-diene is also described in WO 2019/077232. The process performed in the synthesis of the block polymers is the reaction of a living homopolymer obtained by anionic polymerization of a 1,3-diene and of a rare-earth metal metallocene, followed by the subsequent polymerization of a mixture of ethylene and of a 1,3-diene.

The rare-earth metal metallocenes used in catalytic polymerization are generally characterized by means of their catalytic activities expressed in kg of polymer per mole of catalyst per hour or their productivities expressed in grams of polymer per gram of catalyst.

SUMMARY

The Applicant has discovered a novel asymmetric diorganomagnesium compound which bears a first magnesium-carbon bond, this carbon being a constituent carbon atom of a specific benzene nucleus, and a second magnesium-carbon bond, this carbon being a constituent carbon atom of a polymer chain. In the synthesis of a block polymer comprising a 1,3-diene homopolymer block and a copolymer block of ethylene and of 1,3-diene, the use of this novel asymmetric diorganomagnesium compound as co-catalyst of a catalytic system based on a rare-earth metal metallocene makes it possible to improve the catalytic activity and the productivity.

Thus, a first subject of the invention is an asymmetric diorganomagnesium compound of formula (I)

$$R^B—Mg—R^A \quad (I)$$

- $R^A$ being different from $R^B$,
- $R^A$ being a polymer chain containing units of a first monomer chosen from the group of monomers consisting of 1,3-dienes, aromatic α-monoolefins and mixtures thereof,
- $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, on condition that if one of the two ortho carbon atoms is substituted with an isopropyl, the second ortho carbon atom is not substituted with an isopropyl.

A second subject of the invention is a catalytic system based on at least one metallocene of formula (IIIa) or (IIIb) and on a diorganomagnesium compound in accordance with the invention as co-catalyst, $$\{P(Cp^1)(Cp^2)Y\} \quad (IIIa)$$

$$Cp^3Cp^4Y \quad (IIIb)$$

- Y denoting a group including a metal atom which is a rare-earth metal,
- $Cp^1$, $Cp^2$, $Cp^3$ and $Cp^4$, which may be identical or different, being chosen from the group consisting of fluorenyl groups, cyclopentadienyl groups and indenyl groups, the groups being substituted or unsubstituted,
- P being a group bridging the two groups $Cp^1$ and $Cp^2$ and comprising a silicon or carbon atom.

The invention also relates to a process for preparing a polymer, which comprises a step of polymerization of a second monomer chosen from the group of monomers consisting of conjugated dienes, ethylene, α-monoolefins and mixtures thereof in the presence of a catalytic system in accordance with the invention. The polymer obtained via the process in accordance with the invention is a block polymer.

The invention also relates to a process for preparing an asymmetric diorganomagnesium compound in accordance with the invention, which comprises:

- the placing in contact of a living anionic polymer of formula $R^ALi$ with an organomagnesium halide of formula $R^B—Mg—X$,
- the reaction of the living anionic polymer and of the halide,
- $R^A$ being a polymer chain containing units of a first monomer chosen from the group of monomers consisting of 1,3-dienes, aromatic α-monoolefins and mixtures thereof,
- $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, on condition that if one of the two ortho carbon atoms is substituted with an isopropyl, the second ortho carbon atom is not substituted with an isopropyl, X being a halogen chosen from the group consisting of chlorine, fluorine, bromine and iodine.

DETAILED DESCRIPTION OF EXAMPLE EMBODIMENTS

Any interval of values denoted by the expression "between a and b" represents the range of values greater than "a" and less than "b" (that is to say limits a and b excluded), whereas any interval of values denoted by the expression "from a to b" means the range of values extending from "a" up to "b" (that is to say including the strict limits a and b).

The abbreviation "phr" means parts by weight per hundred parts of elastomer (of the total of the elastomers if several elastomers are present).

The compounds mentioned in the description may be of fossil origin or may be biobased. In the latter case, they may be partially or totally derived from biomass or may be obtained from renewable starting materials derived from biomass.

The term "based on" used to define the constituents of the catalytic system means the mixture of these constituents, or the product of the reaction of a portion or all of these constituents with each other.

The compound in accordance with the invention of formula (I) has the essential characteristic of being an "asymmetric" diorganomagnesium compound referred to in the present invention as an asymmetric diorganomagnesium compound, since the two groups represented by the symbols $R^B$ and $R^A$ are different from each other.

$$R^B—Mg—R^A \quad (I)$$

The group represented by the symbol $R^A$ is a polymer chain containing units of a first monomer chosen from the group of monomers consisting of 1,3-dienes, aromatic α-monoolefins and mixtures thereof. The 1,3-diene as first monomer is preferentially 1,3-butadiene, isoprene or a mixture thereof. The aromatic α-monoolefin as first monomer is an α-monoolefin of formula $CH_2{=}CH—Ar$, Ar representing a substituted or unsubstituted aromatic group. The group Ar is preferably phenyl or aryl. The aromatic α-monoolefin as first monomer is preferentially styrene or a styrene substituted with one or more alkyl groups, more preferentially styrene. Preferably, $R^A$ represents a 1,3-butadiene, isoprene or styrene homopolymer chain or a copolymer chain of monomers chosen from 1,3-butadiene, isoprene and styrene.

The group represented by the symbol $R^B$ has the essential characteristic of comprising a benzene nucleus substituted with a magnesium atom. The two carbon atoms of the benzene nucleus ortho to the magnesium bear an identical or different substituent. Alternatively, one of the two carbon atoms of the benzene nucleus ortho to the magnesium may bear a substituent, and the other carbon atom of the benzene nucleus ortho to the magnesium may form a ring. The substituent is a methyl, an ethyl or an isopropyl. In the case where one of the two carbon atoms of the benzene nucleus ortho to the magnesium is substituted with an isopropyl, the second carbon atom of the benzene nucleus ortho to the magnesium is not substituted with an isopropyl. Preferably, the carbon atoms of the benzene nucleus ortho to the magnesium are substituted with a methyl or an ethyl. More preferentially, the carbon atoms of the benzene nucleus ortho to the magnesium are substituted with a methyl.

According to a preferential embodiment, the asymmetric diorganomagnesium compound corresponds to formula (II) in which $R^A$ is a polymer chain as defined previously, $R_1$ and $R_5$, which may be identical or different, represent a methyl or an ethyl and $R_2$, $R_3$ and $R_4$, which may be identical or different, represent a hydrogen atom or an alkyl. Preferably, $R_1$ and $R_5$ represent a methyl. Preferably, $R_2$ and $R_4$ represent a hydrogen atom.

(II)

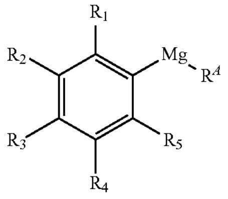

According to a preferential variant, $R_1$, $R_3$ and $R_5$ are identical. According to a more preferential variant, $R_2$ and $R_4$ represent a hydrogen and $R_1$, $R_3$ and $R_5$ are identical. According to a more preferential variant, $R_2$ and $R_4$ represent a hydrogen and $R_1$, $R_3$ and $R_5$ represent a methyl.

According to a preferential embodiment, the polymer chain represented by the symbol $R^A$ is prepared by anionic polymerization.

The asymmetric diorganomagnesium compound in accordance with the invention may be prepared via a process, which is another subject of the invention, said process comprising the following steps:

the placing in contact of a living anionic polymer $R^ALi$ with an organomagnesium halide of formula $R^B—Mg—X$, the reaction of the living anionic polymer and of the halide, X being a halogen chosen from the group consisting of chlorine, fluorine, bromine and iodine, $R^B$ and $R^A$ being as defined previously.

X is preferentially a bromine atom or a chlorine atom. X is more preferentially a bromine atom.

The living anionic polymer that is useful for the synthesis of the organometallic compound of formula $R^ALi$ is typically a polymer chain bearing a carbanion. It generally results from reactions for the initiation and propagation of a polymer chain in the anionic polymerization of the first monomer. The 1,3-dienes, the aromatic α-monoolefins and the mixtures thereof that may be used as first monomer are well known for polymerizing or copolymerizing together anionically and for forming living polymer or copolymer chains. The processes for the polymerization of these monomers are also well known and widely described.

The living anionic polymer is thus conventionally obtained by anionic polymerization of the first monomer in a solvent, known as the polymerization solvent. The polymerization solvent may be any hydrocarbon solvent known for use in the polymerization of 1,3-diene and aromatic α-monoolefin monomers. The polymerization solvent is preferentially a hydrocarbon solvent, better still an aliphatic solvent such as hexane, cyclohexane or methylcyclohexane.

The polymerization solvent for the first monomer may comprise an additive for controlling the microstructure of the polymer chain and the rate of the polymerization reaction. This additive may be a polar agent such as an ether or a tertiary amine. The additive is more usually used in a small amount, notably to limit the deactivation reactions of the anionic polymerization-propagating sites. The amount of additive in the polymerization solvent, conventionally indexed on the number of carbon-metal bonds in the polymerization medium, is regulated according to the desired microstructure of the polymer chain and thus depends on the complexing power of the additive.

The ratio between the amount of solvent and the amount of first monomer that is useful for forming the living polymer is chosen by a person skilled in the art according to the desired viscosity of the living polymer solution. This viscosity depends not only on the concentration of the polymer solution, but also on many other factors such as the length of the polymer chains, the nature of the counterion of the living polymer, the intermolecular interactions between the living polymer chains, the complexing power of the solvent and the temperature of the polymer solution. Consequently, a person skilled in the art adjusts the amount of solvent on a case by case basis.

In the reaction for initiation of the polymerization reaction, a compound known as an initiator of the anionic polymerization of monomers that are useful for the purposes of the invention is used. Preferably, the initiator is a compound which bears a carbon-metal bond. The initiator is used in an amount chosen as a function of the desired chain length of the living polymer and may thus vary to a large extent.

The living polymer is generally prepared by polymerization of the first monomer initiated with an initiator which is a lithium compound. Lithium-based initiators that may be mentioned include organolithium agents, for instance n-butyllithium, sec-butyllithium and tert-butyllithium, which are commonly used in the anionic polymerization of the monomers that are useful for the purposes of the invention.

The polymerization temperature for forming the living polymer may vary to a large extent. It is chosen notably as a function of the stability of the carbon-metal bond in the polymerization solvent, the relative rate coefficients of the initiation reaction and of the propagation reaction, and the targeted microstructure of the living polymer. Conventionally, it varies within a range extending from −20° C. to 100° C., preferentially from 20° C. to 70° C.

Preferably, the living anionic polymer is a living polymer obtained by anionic polymerization of 1,3-butadiene, isoprene, styrene or mixtures thereof. In other words, the first monomer is preferentially 1,3-butadiene, isoprene, styrene or mixtures thereof.

The living anionic polymer may be a homopolymer or a copolymer in the case where the first monomer is a monomer mixture. The copolymer may be in statistical or block form, since the incorporation of the comonomers may be controlled via known operating conditions of anionic polymerization processes. For example, it is known that the polarity of the polymerization solvent and the mode of feeding of the comonomers into the anionic polymerization medium have an influence on the relative incorporation of the comonomers.

In the preparation of the asymmetric diorganomagnesium compound in accordance with the invention, the placing in contact of the living anionic polymer with the organomagnesium halide is preferentially performed by adding a solution of the living anionic polymer $R^ALi$ to a solution of the organomagnesium halide $R^B$—Mg—X. The solution of the living anionic polymer $R^ALi$ is generally a solution in a hydrocarbon solvent, preferably an aliphatic solvent such as n-hexane, cyclohexane or methylcyclohexane. The solution of the organomagnesium halide $R^B$—Mg—X is generally a solution in an ether, preferably diethyl ether or dibutyl ether. The concentration of the living anionic polymer $R^ALi$ is preferentially from 0.01 to 1 mol of lithium equivalent/L, more preferentially from 0.05 to 0.2 mol of lithium equivalent/L, and that of the solution of the organomagnesium agent $R^B$—Mg—X is preferentially from 1 to 5 mol/L, more preferentially from 2 to 3 mol/L.

The reaction between the living anionic polymer $R^ALi$ and the organomagnesium halide $R^B$—Mg—X is typically performed at a temperature ranging from 0° C. to 60° C. The placing in contact is preferably performed at a temperature of between 0° C. and 23° C.

Like any synthesis performed in the presence of organometallic compounds, the placing in contact and the reaction take place under anhydrous conditions under an inert atmosphere. Typically, the solvents and the solutions are used under anhydrous nitrogen or argon. The various steps of the process are generally performed with stirring.

Once the asymmetric diorganomagnesium agent has been formed, it is generally recovered in solution after filtration performed under an inert anhydrous atmosphere. The solution of asymmetric diorganomagnesium agent is typically stored before use in hermetic vessels, for example capped bottles, at a temperature of between −25° C. and 23° C.

Like any organomagnesium compound, the diorganomagnesium compound $R^B$—Mg—$R^A$ that is useful for the purposes of the invention may be in the form of a monomer species $(R^B—Mg—R^A)_1$ or in the form of a polymer species $(R^B—Mg—R^A)_p$, p being an integer greater than 1, notably a dimer $(R^B—Mg—R^A)_2$. Moreover, whether it is in the form of a monomer or polymer species, it may also be in the form of a species coordinated to one or more molecules of a solvent, preferably of an ether such as diethyl ether, tetrahydrofuran or methyltetrahydrofuran.

The asymmetric diorganomagnesium compound in accordance with the invention is most particularly intended to be used as a co-catalyst in a catalytic system comprising an organometallic complex that is useful for the polymerization or copolymerization of olefins or of dienes. The organometallic complex is typically a rare-earth metal metallocene or hemimetallocene.

The purpose of the asymmetric diorganomagnesium compound is to activate the organometallic complex with respect to the polymerization reaction, notably in the polymerization initiation reaction. It can replace the co-catalyst of the catalytic systems described, for example, in EP 1092731 A1, WO 2004/035639 A1, WO 2005/028526 A1, WO 2007/045223 A2 and WO 2007/045224 A2.

In particular, the asymmetric diorganomagnesium compound in accordance with the invention is one of the essential constituents of a catalytic system, which is another subject of the invention. When used as co-catalyst in the catalytic system, the asymmetric diorganomagnesium compound makes it possible to increase the catalytic activity of the catalytic system in the synthesis of block polymers. The polymers are typically copolymers of dienes and of olefins. Olefins that may particularly be mentioned include ethylene and α-olefins, notably those containing 3 to 18 carbon atoms. Dienes that are most particularly suitable for use are 1,3-dienes, more particularly 1,3-dienes containing from 4 to 24 carbon atoms, such as 1,3-butadiene and isoprene.

The base constituents of the catalytic system in accordance with the invention are thus the asymmetric diorganomagnesium compound in accordance with the invention and a metallocene of formula (IIa) or (IIIb)

$\{P(Cp^1)(Cp^2)Y\}$ (IIIa)

$Cp^3Cp^4Y$ (IIIb)

- Y denoting a group including a metal atom which is a rare-earth metal,
- $Cp^1$, $Cp^2$, $Cp^3$ and $Cp^4$, which may be identical or different, being chosen from the group consisting of fluorenyl groups, cyclopentadienyl groups and indenyl groups, the groups being substituted or unsubstituted,
- P being a group bridging the two groups $Cp^1$ and $Cp^2$ and comprising a silicon or carbon atom.

It is recalled that rare-earth elements are metals and denote the elements scandium, yttrium and the lanthanides, the atomic number of which ranges from 57 to 71.

According to a first variant of the invention, the metallocene used as base constituent in the catalytic system in accordance with the invention corresponds to formula (IIIa)

$\{P(Cp^1)(Cp^2)Y\}$ (IIIa)

in which

- Y denotes a group including a metal atom which is a rare-earth metal,
- $Cp^1$ and $Cp^2$, which may be identical or different, are chosen from the group consisting of fluorenyl groups, cyclopentadienyl groups and indenyl groups, the groups being substituted or unsubstituted,
- P is a group bridging the two groups $Cp^1$ and $Cp^2$ and comprising a silicon or carbon atom.

According to a second variant of the invention, the metallocene used as base constituent in the catalytic system in accordance with the invention corresponds to formula (IIIb)

$Cp^3Cp^4Y$ (IIIb)

in which

- Y denotes a group including a metal atom which is a rare-earth metal,
- $Cp^3$ and $Cp^4$, which may be identical or different, are chosen from the group consisting of fluorenyl groups, cyclopentadienyl groups and indenyl groups, the groups being substituted or unsubstituted.

As substituted cyclopentadienyl, fluorenyl and indenyl groups, mention may be made of those substituted with alkyl radicals containing from 1 to 6 carbon atoms or with aryl radicals containing from 6 to 12 carbon atoms or else with trialkylsilyl radicals, such as $SiMe_3$. The choice of the radicals is also guided by the accessibility to the corresponding molecules, which are the substituted cyclopentadienes, fluorenes and indenes, since said molecules are commercially available or can be readily synthesized.

As substituted fluorenyl groups, mention may be made particularly of 2,7-di(tert-butyl)fluorenyl and 3,6-di(tert-butyl)fluorenyl. The 2, 3, 6 and 7 positions respectively denote the position of the carbon atoms of the rings as represented in the diagram below, the 9 position corresponding to the carbon atom to which the bridge P is attached.

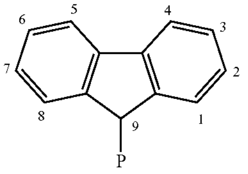

As substituted cyclopentadienyl groups, mention may be made particularly of those substituted in the 2 position, more particularly the tetramethylcyclopentadienyl group. Position 2 (or 5) denotes the position of the carbon atom which is adjacent to the carbon atom to which the bridge P is attached, as is represented in the diagram below.

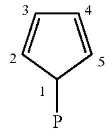

As substituted indenyl groups, mention may be made particularly of those substituted in the 2 position, more particularly 2-methylindenyl or 2-phenylindenyl. Position 2 denotes the position of the carbon atom which is adjacent to the carbon atom to which the bridge P is attached, as is represented in the diagram below.

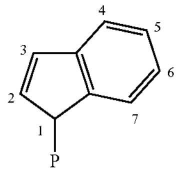

Preferably, the metallocene is of formula (IIIa).

According to a preferential embodiment of the invention, $Cp^1$ and $Cp^2$ are identical and are chosen from the group consisting of substituted fluorenyl groups and the unsubstituted fluorenyl group of formula $C_{13}H_8$. The catalytic system according to this preferential embodiment has the distinguishing feature of resulting in copolymers of butadiene and ethylene which comprise, in addition to the ethylene monomer units and the butadiene units, cyclic 1,2-cyclohexane units having the following formula:

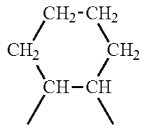

Advantageously, $Cp^1$ and $Cp^2$ are identical and each represent an unsubstituted fluorenyl group of formula $C_{13}H_8$, represented by the symbol Flu.

According to a preferential embodiment of the invention, the symbol Y represents the group Met-G, with Met denoting a metal atom which is a rare-earth metal and with G denoting a group comprising the borohydride $BH_4$ unit or denoting a halogen atom chosen from the group consisting of chlorine, fluorine, bromine and iodine. Advantageously, G denotes a chlorine atom or the group of formula (IV):

$(BH_4)_{(1+y)}$-$L_y$-$N_x$ (IV)

in which

- L represents an alkali metal chosen from the group consisting of lithium, sodium and potassium,
- N represents a molecule of an ether,
- x, which may or may not be an integer, is greater than or equal to 0,
- y, which is an integer, is greater than or equal to 0.

Very advantageously, G denotes the group of formula (IV).

Any ether which has the ability to complex the alkali metal, notably diethyl ether and tetrahydrofuran, is suitable as ether.

According to any one of the embodiments of the invention, the metal of the metallocene that is useful for the purposes of invention, in the case in point the rare-earth metal, is preferably a lanthanide, the atomic number of which ranges from 57 to 71, more preferentially neodymium, Nd.

The bridge P connecting the groups $Cp^1$ and $Cp^2$ preferably corresponds to the formula $ZR^1R^2$, in which Z represents a silicon or carbon atom and $R^1$ and $R^2$, which may be identical or different, each represent an alkyl group comprising from 1 to 20 carbon atoms, preferably a methyl. In the formula $ZR^1R^2$, Z advantageously represents a silicon atom, Si.

The metallocene that is useful for the synthesis of the catalytic system may be in the form of a crystalline or non-crystalline powder, or else in the form of single crystals. The metallocene may be in a monomer or dimer form, these forms depending on the method of preparation of the metallocene, as is described, for example, in patent application WO 2007/054224 or WO 2007/054223. The metallocene may be prepared conventionally by a process analogous to that described in patent application WO 2007/054224 or WO 2007/054223, notably by reaction, under inert and anhydrous conditions, of the salt of an alkali metal of the ligand with a rare-earth metal borohydride in a suitable solvent, such as an ether, for instance diethyl ether or tetrahydrofuran, or any other solvent known to those skilled in the art. After reaction, the metallocene is separated from the reaction by-products via techniques known to those skilled in the art, such as filtration or precipitation from a second solvent. The metallocene is finally dried and isolated in solid form.

According to a particularly preferential embodiment, the metallocene is of formula (III-1), (III-2), (III-3), (III-4) or (III-5):

$$[Me_2Si(Flu)_2Nd(\mu\text{-}BH_4)_2Li(THF)] \quad \text{(III-1)}$$

$$[\{Me_2SiFlu_2Nd(\mu\text{-}BH_4)_2Li(THF)\}_2] \quad \text{(III-2)}$$

$$[Me_2SiFlu_2Nd(\mu\text{-}BH_4)(THF)] \quad \text{(III-3)}$$

$$[\{Me_2SiFlu_2Nd(\mu\text{-}BH_4)(THF)\}_2] \quad \text{(III-4)}$$

$$[Me_2SiFlu_2Nd(\mu\text{-}BH_4)] \quad \text{(III-5)}$$

in which Flu represents the $C_{13}H_8$ group.

The catalytic system in accordance with the invention may be prepared conventionally via a process analogous to that described in patent application WO 2007/054224 or WO 2007/054223. For example, the asymmetric diorganomagnesium compound and the metallocene are reacted in a hydrocarbon solvent typically at a temperature ranging from 20° C. to 80° C. for a time of between 5 and 60 minutes. The amounts of co-catalyst and of metallocene reacted are such that the ratio between the number of moles of Mg of the co-catalyst and the number of moles of rare-earth metal of the metallocene is preferably from 1 to 100 and more preferentially from 1 to less than 10. The range of values extending from 1 to less than 10 is in particular more favourable for obtaining polymers of high molar masses. The catalytic system is generally prepared in an aliphatic hydrocarbon solvent, such as methylcyclohexane, or an aromatic hydrocarbon solvent, such as toluene. Generally, after its synthesis, the catalytic system is used in this form in the process for the synthesis of the polymer in accordance with the invention.

Like any synthesis performed in the presence of an organometallic compound, the synthesis of the metallocene, the synthesis of the asymmetric diorganomagnesium compound and the synthesis of the catalytic system take place under anhydrous conditions under an inert atmosphere. Typically, the reactions are performed starting with anhydrous solvents and compounds under anhydrous nitrogen or argon.

The catalytic system is generally in the form of a solution in a hydrocarbon solvent. The hydrocarbon solvent may be aliphatic, such as methylcyclohexane, or aromatic, such as toluene. The hydrocarbon solvent is preferably aliphatic, more preferentially methylcyclohexane. Generally, the catalytic system is stored in the form of a solution in the hydrocarbon solvent before being used in polymerization. It is then possible to speak of catalytic solution which comprises the catalytic system and the hydrocarbon solvent. The concentration of the catalytic solution is typically defined by the content of metallocene metal in the solution. The concentration of metallocene metal has a value preferentially ranging from 0.0001 to 0.2 mol/L, more preferentially from 0.001 to 0.03 mol/L.

The catalytic system in accordance with the invention is intended to be used in a process for the synthesis of block polymers, notably elastomers, which may be used in rubber compositions, for example for tires. The use of the catalytic system according to the invention in the block polymer process makes it possible to increase the productivity of the process on account of increasing the catalytic activity.

The process, which is another subject of the invention, comprises a step of polymerization of a second monomer chosen from the group of monomers consisting of conjugated dienes, ethylene, α-monoolefins and mixtures thereof in the presence of a catalytic system in accordance with the process for preparing a polymer.

As the process involves the polymerization of a monomer, known as the second monomer, in the presence of a catalytic system which comprises a co-catalyst consisting of a polymer chain $R^A$, the polymer chain $R^A$ and the polymer chain resulting from the polymerization of the second monomer are constituents of the polymer synthesized via the process in accordance with the invention. The polymers synthesized via the process in accordance with the invention are thus diblock or multiblock block polymers. Specifically, the polymer chain $R^A$ may be a homopolymer, a block polymer or a statistical polymer. The polymer chain resulting from the polymerization of the second monomer which results from the polymerization of the second monomer may be a statistical polymer or a block polymer, when the second monomer is a mixture of monomers.

Preferably, the second monomer is ethylene or a mixture of a 1,3-diene and of ethylene, the 1,3-diene preferably being 1,3-butadiene, isoprene or a mixture thereof. According to the microstructure and the length of the polymer chains prepared via the process in accordance with the invention, the polymer may be an elastomer.

The polymerization of the second monomer is preferably performed in solution, continuously or batchwise. The polymerization solvent may be an aromatic or aliphatic hydrocarbon solvent. Examples of polymerization solvents that may be mentioned include toluene and methylcyclohexane. The second monomer may be introduced into the reactor containing the polymerization solvent and the catalytic system or, conversely, the catalytic system may be introduced into the reactor containing the polymerization solvent and the second monomer. The second monomer and the catalytic system may be introduced simultaneously into the reactor containing the polymerization solvent, notably in the case of a continuous polymerization. The polymerization is typically performed under anhydrous conditions and in the absence of oxygen, in the optional presence of an inert gas. The polymerization temperature generally varies within a range extending from 40 to 150° C., preferentially from 40 to 120° C. It is adjusted according to the second monomer to be polymerized. If the second monomer is a mixture of monomers containing ethylene, the copolymerization is preferentially performed at a constant pressure of ethylene.

In the case where the polymerization of a second monomer is the polymerization of a mixture of ethylene and of 1,3-diene in a polymerization reactor, ethylene and 1,3-diene may be added continuously to the polymerization reactor, in which case the polymerization reactor is a fed reactor. This embodiment is most particularly suited for a statistical or random incorporation of ethylene and of the 1,3-diene.

Once the desired degree of conversion of the reaction for the polymerization of the second monomer has been achieved, the polymerization reaction is stopped with a terminating agent, for instance a compound bearing an acidic proton, such as an alcohol. The block polymer may be recovered, notably by separating it from the reaction medium, for example by coagulating it in a solvent which brings about its coagulation or by removing the polymerization solvent and any residual monomer under reduced pressure or under the effect of steam entrainment (stripping operation).

In summary, the invention is advantageously performed according to any one of the following embodiments 1 to 32:

Embodiment 1: Asymmetric diorganomagnesium compound of formula (I)

$$R^B—Mg—R^A \quad (I)$$

- $R^A$ being different from $R^B$,
- $R^A$ being a polymer chain containing units of a first monomer chosen from the group of monomers consisting of 1,3-dienes, aromatic α-monoolefins and mixtures thereof,
- $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, on condition that if one of the two ortho carbon atoms is substituted with an isopropyl, the second ortho carbon atom is not substituted with an isopropyl.

Embodiment 2: Asymmetric diorganomagnesium compound according to embodiment 1, in which the diorganomagnesium compound is of formula (II)

(II)

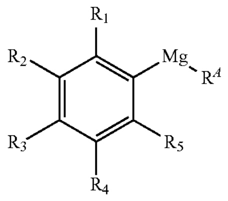

- $R_1$ and $R_5$, which may be identical or different, represent a methyl or an ethyl,
- $R_2$, $R_3$ and $R_4$, which may be identical or different, being a hydrogen atom or an alkyl,
- $R^A$ being defined according to embodiment 1.

Embodiment 3: Asymmetric diorganomagnesium compound according to embodiment 2 in which $R_1$ and $R_5$ represent a methyl.

Embodiment 4: Asymmetric diorganomagnesium compound according to embodiment 2 or 3, in which $R_2$ and $R_4$ represent a hydrogen atom.

Embodiment 5: Asymmetric diorganomagnesium compound according to any one of embodiments 2 to 4, in which $R_3$ is identical to $R_1$ and to $R_5$.

Embodiment 6: Asymmetric diorganomagnesium compound according to any one of embodiments 1 to 5, in which the carbon atoms of the benzene nucleus ortho to the magnesium are substituted with a methyl or an ethyl.

Embodiment 7: Asymmetric diorganomagnesium compound according to any one of embodiments 1 to 6, in which the carbon atoms of the benzene nucleus ortho to the magnesium are substituted with a methyl.

Embodiment 8: Asymmetric diorganomagnesium compound according to any one of embodiments 1 to 7, in which $R^A$ is a 1,3-butadiene, isoprene or styrene homopolymer chain or a copolymer chain of monomers chosen from 1,3-butadiene, isoprene and styrene.

Embodiment 9: Asymmetric diorganomagnesium compound according to any one of embodiments 1 to 7, in which the polymer chain represented by the symbol $R^A$ is prepared by anionic polymerization.

Embodiment 10: Catalytic system based at least:

on a metallocene of formula (IIIa) or (IIIb), on a diorganomagnesium compound as cocatalyst, $$\{P(Cp^1)(Cp^2)Y\} \quad (II)$$

$$Cp^3Cp^4Y \quad (IIIb)$$

- Y denoting a group including a metal atom which is a rare-earth metal,
- $Cp^1$, $Cp^2$, $Cp^3$ and $Cp^4$, which may be identical or different, being chosen from the group consisting of fluorenyl groups, cyclopentadienyl groups and indenyl groups, the groups being substituted or unsubstituted,
- P being a group bridging the two groups $Cp^1$ and $Cp^2$ and comprising a silicon or carbon atom,
- the diorganomagnesium compound being an asymmetric diorganomagnesium compound defined in any one of embodiments 1 to 9.

Embodiment 11: Catalytic system according to embodiment 10, in which the metallocene is of formula (IIIa).

Embodiment 12: Catalytic system according to either of embodiments 10 and 11, in which $Cp^1$ and $Cp^2$ are identical and are chosen from the group consisting of substituted fluorenyl groups and the unsubstituted fluorenyl group of formula $C_{13}H_8$.

Embodiment 13: Catalytic system according to any one of embodiments 10 to 12, in which $Cp^1$ and $Cp^2$ each represent an unsubstituted fluorenyl group of formula $C_{13}H_8$.

Embodiment 14: Catalytic system according to any one of embodiments 10 to 13, in which the symbol Y represents the group Met-G, with Met denoting a metal atom which is a rare-earth metal and G denoting a group comprising the borohydride $BH_4$ unit or denoting a halogen atom chosen from the group consisting of chlorine, fluorine, bromine and iodine.

Embodiment 15: Catalytic system according to embodiment 14, in which G denotes chlorine or the group of formula (IV)

$$(BH_4)_{(1+y)y}\text{-}L_y\text{-}N_x \quad \text{(IV)}$$

in which

L represents an alkali metal chosen from the group consisting of lithium, sodium and potassium, N represents a molecule of an ether, preferably diethyl ether or tetrahydrofuran, x, which may or may not be an integer, is greater than or equal to 0, y, which is an integer, is greater than or equal to 0.

Embodiment 16: Catalytic system according to embodiment 15, in which G denotes the group of formula (IV).

Embodiment 17: Catalytic system according to any one of embodiments 10 to 16, in which the rare-earth metal is a lanthanide, the atomic number of which ranges from 57 to 71.

Embodiment 18: Catalytic system according to any one of embodiments 10 to 17, in which the rare-earth metal is neodymium, Nd.

Embodiment 19: Catalytic system according to any one of embodiments 10 to 18, in which the bridge P corresponds to the formula $ZR^1R^2$, Z representing a silicon or carbon atom, $R^1$ and $R^2$, which may be identical or different, each representing an alkyl group comprising from 1 to 20 carbon atoms, preferably a methyl.

Embodiment 20: Catalytic system according to embodiment 19, in which Z is Si.

Embodiment 21: Catalytic system according to any one of embodiments 10 to 20, in which the metallocene is (III-1), (III-2), (III-3), (III-4) or (III-5):

$[Me_2Si(Flu)_2Nd(\mu\text{-}BH_4)_2Li(THF)]$ (III-1)

$[\{Me_2SiFlu_2Nd(\mu\text{-}BH_4)_2Li(THF)\}_2]$ (III-2)

$[Me_2SiFlu_2Nd(\mu\text{-}BH_4)(THF)]$ (III-3)

$[\{Me_2SiFlu_2Nd(\mu\text{-}BH_4)(THF)\}_2]$ (III-4)

$[Me_2SiFlu_2Nd(\mu\text{-}BH_4)]$ (III-5)

Flu representing the $C_{13}H_8$ group.

Embodiment 22: Catalytic system according to any one of embodiments 10 to 21, in which the ratio between the number of moles of Mg of the co-catalyst and the number of moles of rare-earth metal of the metallocene ranges from 1 to 100.

Embodiment 23: Catalytic system according to any one of embodiments 10 to 22, in which the ratio between the number of moles of Mg of the co-catalyst and the number of moles of rare-earth metal of the metallocene ranges from 1 to 10.

Embodiment 24: Catalytic system according to any one of embodiments 10 to 23, which catalytic system is in the form of a solution in a hydrocarbon solvent.

Embodiment 25: Catalytic system according to embodiment 24, in which the hydrocarbon solvent is aromatic or aliphatic, preferably aliphatic, more preferentially methylcyclohexane.

Embodiment 26: Catalytic system according to either of embodiments 24 and 25, in which the molar concentration of metal of the metallocene in the catalytic system has a value ranging from 0.0001 to 0.2 mol/L, preferentially from 0.001 to 0.03 mol/L.

Embodiment 27: Process for preparing a polymer, which comprises a step of polymerization of a second monomer chosen from the group of monomers consisting of conjugated dienes, ethylene, α-monoolefins and mixtures thereof in the presence of a catalytic system defined in any one of embodiments 10 to 26.

Embodiment 28: Process according to embodiment 27, in which the second monomer is ethylene or a mixture of a 1,3-diene and of ethylene.

Embodiment 29: Process according to embodiment 28, in which the 1,3-diene is 1,3-butadiene, isoprene or a mixture thereof.

Embodiment 30: Process for the preparation of an asymmetric diorganomagnesium compound defined in any one of embodiments 1 to 9, which comprises:

the placing in contact of a living anionic polymer of formula $R^ALi$ with an organomagnesium halide of formula $R^B$—Mg—X, the reaction of the living anionic polymer and of the halide, X being a halogen chosen from the group consisting of chlorine, fluorine, bromine and iodine, $R^A$ and $R^B$ being defined according to any one of embodiments 1 to 9.

Embodiment 31: Process according to embodiment 30, in which X is a bromine atom or a chlorine atom.

Embodiment 32: Method according to embodiment 30 or 31, in which X is a bromine atom.

The abovementioned characteristics of the present invention, and also others, will be understood more clearly on reading the following description of several implementation examples of the invention, which are given as non-limiting illustrations.

Implementation Examples of the Invention

1. Size Exclusion Chromatography (SEC)

The molar masses were determined by universal calibration using polystyrene standards certified by Polymer Laboratories and a double detection with a refractometer and coupling to a viscometer.

Without being an absolute method, SEC makes it possible to comprehend the molar mass distribution of a polymer. On the basis of standard commercial products of polystyrene type, the various number-average (Mn) and weight-average (Mw) molar masses can be determined and the polydispersity index can be calculated (PDI=Mw/Mn).

The polymer is dissolved in tetrahydrofuran (THF) to a concentration of 1 g/L, the solution is filtered through a filter of porosity 0.45 m, and is then injected into a chromatograph equipped with two detectors, a Waters 410 refractometer and a viscometer, using a Waters 717 injector and a Waters 515 HPLC pump at a flow rate of 1 $ml\cdot min^{-1}$ in a series of Polymer Laboratories columns.

This series of columns, placed in a chamber thermostatically maintained at 45° C., is composed of:

1 PL Gel 5 μm precolumn,

2 PL Gel 5 μm Mixed C columns,

1 PL Gel 5 μm-500 Å column.

2. Nuclear Magnetic Resonance (NMR) (Synthesis of the Polymer Containing Units of a First Monomer)

The spectra are acquired on a Bruker Avance III 500 MHz spectrometer equipped with a BBIz-grad 5 mm broad-band cryoprobe. The samples are dissolved in $d_4$-1,2-dichlorobenzene. Calibration is performed on the protonated impurity of the 1,2-dichlorobenzene at 7.20 ppm in 1H NMR. The quantitative $^1H$ NMR experiment uses a 300 single pulse sequence and a repetition time of 5 seconds between each acquisition.

3. Nuclear Magnetic Resonance (NMR) (Synthesis of the Block Polymer)

The block polymers are dissolved in $d_4$-1,2-dichlorobenzene. Calibration is performed on the protonated impurity of the 1,2-dichlorobenzene at 7.20 ppm in $^1H$ NMR.

The quantitative $^1H$ NMR experiment uses a 300 single pulse sequence and a repetition time of 5 seconds between each acquisition. 64 to 256 accumulations are performed. The two-dimensional $^1H/^{13}C$ experiments are used with the aim of determining the structure of the units of the polymers. The $^1H/^{13}C$ HMBC (heteronuclear multiple bond correlation) experiment makes it possible to detect long-distance correlations by J coupling between protons and carbon-13 nuclei.

The $^1H$ NMR spectra and the edited $^1H/^{13}C$ $^1J$ HSQC 2D NMR correlation spectrum make it possible to determine the microstructure of the block polymer and the proportion of each block in the sample.

Determination of the Percentage of Block Polymer by DOSY:

The DOSY experiment, an NMR method, allows analysis of complex mixtures and detection of traces. The aim of this experiment is to show that the block polymer represents the majority of the sample and that the presence of the homopolymer is very low.

The DOSY NMR analysis makes it possible to separate the species present, notably polymer matrices, by analysis of their solution diffusion coefficient. The principle of the technique is as follows:

The DOSY experiment consists in recording proton spectra while varying the force G of the gradients applied and thus the diffusion force. A linear increase in the intensity of the gradients brings about an exponential decrease in the intensity of the NMR signal. The DOSY experiment produces a two-dimensional map. The second dimension F2 of the DOSY corresponds, after Fourier transform treatment, to the 1H dimension. The first dimension F1 corresponds to the decrease of the NMR signal as a function of the applied gradient force. After treatment of the dimension F2, the diffusion coefficient is extracted using equation (1), and a DOSY map is obtained $$I=I0\cdot\exp(-D\gamma^2 G^2 \delta^2(\Delta-\delta/3)) \quad (1)$$

If the two matrices have an identical diffusion coefficient, this means that the two matrices have the same hydrodynamic radius and are thus grafted. On the other hand, if the two matrices have two different diffusion coefficients, this means that they are free with respect to each other.

The equation which describes the diffusion coefficient is as follows:

$$D = \frac{k_B T}{6\pi\eta r_S}$$

The experiment was performed on samples of poly(butadiene-b-poly(ethylene-co-butadiene) synthesized according to the process in accordance with the invention.

The recording of two 1D $^1H$ NMR spectra with a diffusion filter, one with a magnetic field gradient set at 90% of the maximum power of the gradient amplifier and the other at 1% of this value, allows, by comparison with the $^1H$ NMR spectrum, to observe the proportion of signal loss due to the spatial diffusion of the molecules and to relaxation of the magnetization. The signal loss due to diffusion is then attributed to "small molecules" not grafted to the polymer matrix (reagents, antioxidants, solvents, etc.).

The chemical shift between 5.18 and 4.96 ppm is attributed to the 1,4 moieties of the isoprene units, and the chemical shift between 4.79 and 4.49 ppm is attributed to the 3,4 moieties of the isoprene units. The chemical shift between 5.36 and 5.10 ppm is attributed to the 1,4 moieties of the butadiene units, and the signal between 5.63 and 5.36 ppm is attributed to the 1,2 moieties of the butadiene units.

The chemical shifts between 6.0-5.63 ppm and 1.75-1.63 ppm are attributed to the 6-membered ring moieties, 1,2-cyclohexanediyl.

The signal at 1.18 ppm is attributed to the ethylene units.

Starting Materials:

Phenylmagnesium bromide dissolved in diethyl ether at 3 mol/L, mesitylmagnesium bromide dissolved in diethyl ether at 1 mol/L, and triisopropylphenylmagnesium bromide dissolved in tetrahydrofuran at 0.5 mol/L are obtained from Sigma-Aldrich and used without prior purification.

4. Example 1 in Accordance with the Invention

Synthesis of a Living Polyisoprene 280 mL of degassed methylcyclohexane (MCH) are introduced into a 750 mL Steinie bottle. 5.64 g of isoprene are introduced into the reaction medium followed by 1 mL of sec-BuLi at 0.38 mol/L. The polymerization is maintained at 50° C. for 2 hours. The conversion measured, by the solids content, is 96%.

For its characterization the living polyisoprene is deactivated by adding degassed methanol. The polymer solution is dried in an oven at 50° C. under vacuum while flushing with nitrogen for 48 hours.

The number-average molar mass of the polyisoprene is 22 350 g/mol (PDI=1.09), and the molar contents of the 1,4 and 3,4 moieties of the isoprene units are, respectively, 94.2% and 5.8%. The macrostructure and the microstructure of the polyisoprene are determined, respectively, by size exclusion chromatography and by nuclear magnetic resonance, as described above in paragraphs 1 and 2, respectively.

Synthesis of an Asymmetric Diorganomagnesium Compound (Polyisoprene-Mg-Mesityl)

The asymmetric diorganomagnesium compound (polyisoprene-Mg-mesityl) is synthesized by a lithium-magnesium metal exchange reaction. 0.3 mL of mesityl-Mg—Br at 1 mol/L in dibutyl ether is introduced onto the lithiated living polyisoprene. The reaction medium is stirred at 23° C. for 1 hour.

Synthesis of a Block Polymer

A solution containing 280 mL of the asymmetric diorganomagnesium compound polyisoprene-Mg-mesityl and 48.8 mg of metallocene $[\{Me_2SiFlu_2Nd(\mu\text{-}BH_4)_2Li(THF)\}]_2$ (76.3 μmol) is placed in a 500 mL glass reactor, heated to 50° C.

A gaseous mixture containing 20 mol % of butadiene and 80 mol % of ethylene is then introduced into the reactor. The polymerization is performed at 50° C. and at an initial pressure of 4 bar absolute in the reactor.

The polymerization reaction is stopped, after formation of 9 g of polymer, by cooling, degassing the reactor and adding methanol. The polymer is recovered and then dried. The weighed mass makes it possible to determine the mean catalytic activity of the catalytic system, expressed in kilograms of polymer synthesized per mole of neodymium metal and per hour (kg/mol·h).

The catalytic activity is 23 kg/mol·h.

The macrostructure and the microstructure of the polymer are determined, respectively, by size exclusion chromatography according to the method described in paragraph 1 and by nuclear magnetic resonance, as described above in paragraph 2. The NMR results are given in Table 1, which gives the molar percentage of the units in the diblock copolymer. The results of the SEC and NMR characterizations show that the polymer contains 30% by mass of polyisoprene and 70% by mass of a block copolymer consisting of a first block of polyisoprene and of a second statistical block of ethylene and of 1,3-butadiene.

TABLE 1

| Unit | diblock |
|---|---|
| Butadiene, 1,2 moiety | 11 |
| Butadiene, 1,4 moiety | 5 |
| Ethylene | 82 |
| 1,2-cyclohexanediyl | 2 |
| Isoprene, 1,4 moiety | 93.9 ± 0.9 |
| Isoprene, 3,4 moiety | 6.1 ± 0.2 |

5. Example 2 in Accordance with the Invention

Synthesis of a Living Polyisoprene 100 mL of methylcyclohexane (MCH) sparged beforehand with nitrogen are placed in a 500 mL reactor. 1 mL of sec-BuLi at 0.38 mol/L is introduced into the reactor. The reactor is heated to 50° C. and a mixture of isoprene (5.64 g) and of MCH (100 mL) is then introduced into the reactor.

The polymerization is maintained for 2 hours at 50° C. to reach 100% conversion.

Synthesis of an Asymmetric Diorganomagnesium Compound (Polyisoprene-Mg-Mesityl)

0.3 mL of Mes-Mg—Br at 1 mol/L dissolved in 20 mL of MCH is introduced into the reactor containing the living anionic polyisoprene. The reaction medium is stirred at 50° C. for 1 hour.

Synthesis of a Block Polymer 48.8 mg of metallocene $[\{Me_2SiFlu_2Nd(\mu\text{-}BH_4)_2Li(THF)\}]_2$ (76.3 μmol) dissolved in 40 mL of MCH are introduced into the reaction medium containing the asymmetric diorganomagnesium compound (polyisoprene-Mg-mesityl). A further 40 mL of MCH are used to rinse the Steinie bottle which contained the metallocene, and are then introduced into the reaction medium.

The reactor is subsequently conditioned under vacuum, and a gaseous mixture containing 20 mol % of butadiene and 80 mol % of ethylene is then introduced into the reactor. The polymerization is performed at 50° C., at an initial pressure of 4 bar absolute in the glass reactor.

The polymerization reaction is stopped, after formation of 11 g of polymer, by cooling, degassing the reactor and adding methanol. The polymer is recovered and then dried. The weighed mass makes it possible to determine the mean catalytic activity of the catalytic system, expressed in kilograms of polymer synthesized per mole of neodymium metal and per hour (kg/mol·h).

The catalytic activity is 37 kg/mol·h.

The macrostructure and the microstructure of the polymer are determined, respectively, by size exclusion chromatography according to the method described in paragraph 1 and by nuclear magnetic resonance, as described above in paragraph 2. The NMR results are given in Table 2, which gives the molar percentage of the units in the diblock copolymer. The results of the SEC and NMR characterizations show that the polymer contains 15% by mass of polyisoprene and 85% by mass of a block polymer consisting of a first block of polyisoprene and of a second statistical block of ethylene and of 1,3-butadiene.

TABLE 2

| Unit | diblock |
|---|---|
| Butadiene, 1,2 moiety | 8 |
| Butadiene, 1,4 moiety | 4 |
| Ethylene | 84 |
| 1,2-cyclohexanediyl | 4 |
| Isoprene, 1,4 moiety | 93.8 ± 0.9 |
| Isoprene, 3,4 moiety | 6.2 ± 0.1 |

6. Example 3 in Accordance with the Invention

Synthesis of a Living Polyisoprene 280 mL of degassed methylcyclohexane (MCH) are introduced into a 750 mL Steinie bottle. 5.64 g of isoprene are introduced into the reaction medium followed by 5.5 mL of n-BuLi at 0.06 mol/L. The polymerization is maintained at 50° C. for 2 hours. The conversion measured, by the solids content, is 85%.

The number-average molar mass of the polyisoprene is 22 170 g/mol (PDI=1.55), and the molar contents of the 1,4 and 3,4 moieties of the isoprene units are, respectively, 94.1% and 5.9%. The macrostructure and the microstructure of the polyisoprene are determined, respectively, by size exclusion chromatography and by nuclear magnetic resonance, as described above in paragraphs 1 and 2, respectively.

Synthesis of an Asymmetric Diorganomagnesium Compound (Polyisoprene-Mg-Mesityl)

The asymmetric diorganomagnesium compound (polyisoprene-Mg-mesityl) is synthesized by a lithium-magnesium metal exchange reaction. 0.28 mL of mesityl-Mg—Br at 1 mol/L in dibutyl ether is introduced onto the lithiated living polyisoprene. The reaction medium is stirred at 23° C. for 1 hour.

Synthesis of a Block Polymer

A solution containing 280 mL of the asymmetric diorganomagnesium compound polyisoprene-Mg-mesityl and 42.4 mg of metallocene $[\{Me_2SiFlu_2Nd(\mu\text{-}BH_4)_2Li(THF)\}]_2$ (76.3 μmol) is placed in a 500 mL glass reactor, heated to 80° C.

A gaseous mixture containing 20 mol % of butadiene and 80 mol % of ethylene is then introduced into the reactor. The polymerization is performed at 80° C. and at an initial pressure of 4 bar absolute in the reactor.

The polymerization reaction is stopped, after formation of 3 g of polymer, by cooling, degassing the reactor and adding methanol. The polymer is recovered and then dried. The weighed mass makes it possible to determine the mean catalytic activity of the catalytic system, expressed in kilograms of polymer synthesized per mole of neodymium metal and per hour (kg/mol·h).

The catalytic activity is 346 kg/mol·h.

The macrostructure and the microstructure of the polymer are determined, respectively, by size exclusion chromatography according to the method described in paragraph 1 and by nuclear magnetic resonance, as described above in paragraph 2. The NMR results are given in Table 3, which gives the molar percentage of the units in the diblock copolymer. The results of the SEC and NMR characterizations show that the polymer contains 50% by mass of polyisoprene and 50% by mass of a block copolymer consisting of a first block of polyisoprene and of a second statistical block of ethylene and of 1,3-butadiene.

TABLE 3

| Unit | diblock |
|---|---|
| Butadiene, 1,2 moiety | 8 |
| Butadiene, 1,4 moiety | 11 |
| Ethylene | 81 |
| 1,2-cyclohexanediyl | 0 |
| Isoprene, 1,4 moiety | 94.1 ± 0.9 |
| Isoprene, 3,4 moiety | 5.9 ± 0.2 |

7. Example 4 in Accordance with the Invention

Synthesis of a Living Polybutadiene 280 mL of degassed methylcyclohexane (MCH) are introduced into a 750 mL Steinie bottle. 5.64 g of butadiene are introduced into the reaction medium followed by 1 mL of sec-BuLi at 0.38 mol/L. The polymerization is maintained at 50° C. for 2 hours. The conversion measured, by the solids content, is 88%.

For its characterization the living polybutadiene is deactivated by adding degassed methanol. The polymer solution is dried in an oven at 50° C. under vacuum while flushing with nitrogen for 48 hours.

The number-average molar mass of the polybutadiene is 23 100 g/mol (PDI=1.08), and the molar contents of the 1,4 and 1,2 moieties of the butadiene units are, respectively, 92.8% and 7.2%. The macrostructure and the microstructure of the polybutadiene are determined, respectively, by size exclusion chromatography and by nuclear magnetic resonance, as described above in paragraphs 1 and 2, respectively.

Synthesis of an Asymmetric Diorganomagnesium Compound (Polybutadiene-Mg-Mesityl)

The asymmetric diorganomagnesium compound (polybutadiene-Mg-mesityl) is synthesized by a lithium-magnesium metal exchange reaction. 0.3 mL of mesityl-Mg—Br at 1 mol/L in dibutyl ether is introduced onto the lithiated living polybutadiene. The reaction medium is stirred at 23° C. for 1 hour.

Synthesis of a Block Polymer

A solution containing 280 mL of the asymmetric diorganomagnesium compound polybutadiene-Mg-mesityl and 45.1 mg of metallocene $[\{Me_2SiFlu_2Nd(\mu\text{-}BH_4)_2Li(THF)\}]_2$ (76.3 μmol) is placed in a 500 mL glass reactor, heated to 80° C.

A gaseous mixture containing 20 mol % of butadiene and 80 mol % of ethylene is then introduced into the reactor. The polymerization is performed at 80° C. and at an initial pressure of 4 bar absolute in the reactor.

The polymerization reaction is stopped, after formation of 3 g of polymer, by cooling, degassing the reactor and adding methanol. The polymer is recovered and then dried. The weighed mass makes it possible to determine the mean catalytic activity of the catalytic system, expressed in kilograms of polymer synthesized per mole of neodymium metal and per hour (kg/mol·h).

The catalytic activity is 193 kg/mol·h.

The macrostructure and the microstructure of the polymer are determined, respectively, by size exclusion chromatography according to the method described in paragraph 1 and by nuclear magnetic resonance, as described above in paragraph 2. The NMR results are given in Table 4, which gives the molar percentage of the units in the diblock copolymer. The results of the SEC and NMR characterizations show that the polymer contains 30% by mass of polybutadiene and 70% by mass of a block copolymer consisting of a first block of polybutadiene and of a second statistical block of ethylene and of 1,3-butadiene.

TABLE 4

| Unit | diblock |
|---|---|
| Butadiene, 1,2 moiety | 15.3 |
| Butadiene, 1,4 moiety | 84.7 |
| Ethylene | 39 |
| 1,2-cyclohexanediyl | 6 |

8. Non-Compliant Example 5

Synthesis of a Living Polybutadiene 50 mL of degassed toluene (MCH) are introduced into a 250 mL Steinie bottle. 2.5 g of butadiene are introduced into the reaction medium followed by 0.54 mL of n-BuLi at 0.19 mol/L. The polymerization is maintained at 60° C. for 1 hour 30 minutes. The conversion measured, by the solids content, is 91%.

For its characterization the living polybutadiene is deactivated by adding degassed methanol. The polymer solution is dried in an oven at 50° C. under vacuum while flushing with nitrogen for 48 hours.

The number-average molar mass of the polybutadiene is 50750 g/mol (PDI=1.08). The macrostructure is determined by size exclusion chromatography, as described above in paragraph 1.

Synthesis of a Block Polymer

A solution containing 240 mL of toluene and 62.2 mg of metallocene $[\{Me_2SiFlu_2Nd(\mu\text{-}BH_4)_2Li(THF)\}]_2$ (96.5 μmol) is placed in a 500 mL glass reactor, heated to 80° C. The solution of living polybutadiene, prepared in the preceding paragraph, is added to the reactor, and a gaseous mixture containing 20 mol % of butadiene and 80 mol % of ethylene is then introduced into the reactor. The polymerization is performed at 80° C. and at an initial pressure of 4 bar absolute in the reactor.

The polymerization reaction is stopped, after formation of 3 g of polymer, by cooling, degassing the reactor and adding methanol. The polymer is recovered and then dried. The weighed mass makes it possible to determine the mean catalytic activity of the catalytic system, expressed in kilograms of polymer synthesized per mole of neodymium metal and per hour (kg/mol·h).

The catalytic activity is 59 kg/mol·h.

The macrostructure of the polymer is determined by size exclusion chromatography, according to the method described in paragraph 1. The result of the SEC characterizations shows that the polymer contains 50% by mass of polybutadiene and 50% by mass of a block copolymer consisting of a first block of polybutadiene and of a second statistical block of ethylene and of 1,3-butadiene.

10. Example 6 not in Accordance with the Invention

Synthesis of a Living Polybutadiene 50 mL of degassed toluene (MCH) are introduced into a 250 mL Steinie bottle. 1 g of butadiene are introduced into the reaction medium followed by 0.54 mL of n-BuLi at 0.19 mol/L. The polymerization is maintained at 60° C. for 1 hour 30 minutes.

For its characterization the living polybutadiene is deactivated by adding degassed methanol. The polymer solution is dried in an oven at 50° C. under vacuum while flushing with nitrogen for 48 hours.

The number-average molar mass of the polybutadiene is 17140 g/mol (PDI=1.12). The macrostructure is determined by size exclusion chromatography, as described above in paragraph 1.

Synthesis of a Block Polymer

A solution containing 246 mL of toluene and 61.7 mg of metallocene $[\{Me_2SiFlu_2Nd(\mu\text{-}BH_4)_2Li(THF)\}]_2$ (96.5 μmol) is placed in a 500 mL glass reactor, heated to 80° C. The solution of living polybutadiene, prepared in the preceding paragraph, is added to the reactor, and a gaseous mixture containing 20 mol % of butadiene and 80 mol % of ethylene is then introduced into the reactor. The polymerization is performed at 80° C. and at an initial pressure of 4 bar absolute in the reactor.

The polymerization reaction is stopped, after formation of 3 g of polymer, by cooling, degassing the reactor and adding methanol. The polymer is recovered and then dried. The weighed mass makes it possible to determine the mean catalytic activity of the catalytic system, expressed in kilograms of polymer synthesized per mole of neodymium metal and per hour (kg/mol·h).

The catalytic activity is 75 kg/mol·h.

The macrostructure of the polymer is determined by size exclusion chromatography, according to the method described in paragraph 1. The results of the SEC characterizations show that the polymer contains 30% by mass of polybutadiene and 70% by mass of a block copolymer consisting of a first block of polybutadiene and of a second statistical block of ethylene and of 1,3-butadiene.

Table 5 collates the catalytic activities and the productivities according to whether a process in accordance with the invention (Examples 3 and 4) or not in accordance with the invention (Examples 5 and 6) is used.

TABLE 5

| Example | Cocatalyst | Activity (kg/mol/h) | Productivity (g/g) |
|---|---|---|---|
| 3 | PI-Mg-Mes | 346 | 90 |
| 4 | PB-Mg-Mes | 193 | 75 |
| 5 | PBLi | 59 | 24 |
| 6 | PBLi | 75 | 29 |

The results show that the process in accordance with the invention is much more efficient as regards the catalytic activity and much more productive than the process not in accordance with the invention in the synthesis of a block polymer. In summary, the use of a diorganomagnesium compound in accordance with the invention as a co-catalyst makes it possible to significantly improve the catalytic activity and the productivity in the synthesis of a block polymer.

The invention claimed is:

1. An asymmetric diorganomagnesium compound of formula (II)

(II)

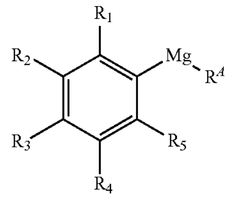

$R_1$ and $R_5$, which may be identical or different, represent a methyl or an ethyl, $R_2$, $R_3$ and $R_4$, which may be identical or different, being a hydrogen atom or an alkyl, and $R^A$ being a 1,3-butadiene, isoprene or styrene homopolymer chain or a copolymer chain of monomers chosen from 1,3-butadiene, isoprene and styrene.

2. The asymmetric diorganomagnesium compound according to claim 1, in which the carbon atoms of the benzene nucleus ortho to the magnesium are substituted with a methyl or an ethyl.

3. A catalytic system based at least:

on a metallocene of formula (IIa) or (IIIb), on a diorganomagnesium compound as cocatalyst, $$\{P(Cp^1)(Cp^2)\} \quad \text{(IIIa)}$$

$$Cp^3Cp^4Y \quad \text{(IIIb)}$$

Y denoting a group including a metal atom which is a rare-earth metal, $Cp^1$, $Cp^2$, $Cp^3$ and $Cp^4$, which may be identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, the diorganomagnesium compound being an asymmetric diorganomagnesium compound defined in claim 1.

4. The catalytic system according to claim 3, in which $Cp^1$ and $Cp^2$ are identical and are chosen from the group consisting of substituted fluorenyl groups and the unsubstituted fluorenyl group of formula $C_{13}H_8$.

5. The catalytic system according to claim 3, in which the symbol Y represents the group Met-G, with Met denoting a metal atom which is a rare-earth metal and G denoting a group comprising the borohydride $BH_4$ unit or denoting a halogen atom chosen from the group consisting of chlorine, fluorine, bromine and iodine.

6. The catalytic system according to claim 5, in which G denotes chlorine or the group of formula (IV)

$$(BH_4)_{(1+y)}\text{-}L_y\text{-}N_x \quad \text{(IV)}$$

in which

L represents an alkali metal chosen from the group consisting of lithium, sodium and potassium, N represents a molecule of an ether, x, which may or may not be an integer, is greater than or equal to 0, y, which is an integer, is greater than or equal to 0.

7. The catalytic system according to claim 3, in which the rare-earth metal is a lanthanide, the atomic number of which ranges from 57 to 71.

8. The catalytic system according to claim 3, in which the bridge P corresponds to the formula $ZR^1R^2$, Z representing a silicon or carbon atom and $R^1$ and $R^2$, which may be identical or different, each representing an alkyl group comprising from 1 to 20 carbon atoms.

9. The catalytic system according to claim 8, in which Z is Si.

10. The catalytic system according to claim 3, in which the metallocene is of formula (III-1), (III-2), (III-3), (III-4) or (III-5):

$$[Me_2Si(Flu)_2Nd(\mu\text{-}BH_4)_2Li(THF)] \quad \text{(III-1)}$$

$$[\{Me_2SiFlu_2Nd(\mu\text{-}BH_4)_2Li(THF)\}_2] \quad \text{(III-2)}$$

$$[Me_2SiFlu_2Nd(\mu\text{-}BH_4)(THF)] \quad \text{(III-3)}$$

$$[\{Me_2SiFlu_2Nd(\mu\text{-}BH_4)(THF)\}_2] \quad \text{(III-4)}$$

$$[Me_2SiFlu_2Nd(\mu\text{-}BH_4)] \quad \text{(III-5)}$$

Flu representing the $C_{13}H_8$ group.

11. A process for preparing a polymer, which comprises a step of polymerization of a second monomer chosen from the group of monomers consisting of conjugated dienes, ethylene, α-monoolefins and mixtures thereof in the presence of a catalytic system defined in claim 3.

12. The process according to claim 11, in which the second monomer is ethylene or a mixture of a 1,3-diene and of ethylene.

13. A process for preparing an asymmetric diorganomagnesium compound defined in claim 1, which comprises:

the placing in contact of a living anionic polymer of formula $R^ALi$ with an organomagnesium halide of formula $R^B$—Mg—X, the reaction of the living anionic polymer and of the halide, X being a halogen chosen from the group consisting of chlorine, fluorine, bromine and iodine, $R^A$ being a polymer chain containing units of a first monomer chosen from the group of monomers consisting of 1,3-dienes, aromatic α-monoolefins and mixtures thereof, and $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, on condition that if one of the two ortho carbon atoms is substituted with an isopropyl, the second ortho carbon atom is not substituted with an isopropyl.

14. The asymmetric diorganomagnesium compound according to claim 2, in which the $R_1$ and $R_5$ represent a methyl.

15. The asymmetric diorganomagnesium compound according to claim 2, in which the carbon atoms of the benzene nucleus ortho to the magnesium are substituted with a methyl.

16. The catalytic system of claim 3, in which the metallocene is of formula (IIIa).

17. The catalytic system according to claim 6, in which N represents a molecule of diethyl ether or tetrahydrofuran.

18. The catalytic system according to claim 7, in which the rare-earth metal is neodymium.

* * * * *